US007567747B2

(12) United States Patent
Hira (10) Patent No.: US 7,567,747 B2
(45) Date of Patent: Jul. 28, 2009

(54) RECORDING METHOD AND SYSTEM FOR SELECTING PROGRAMS TO BE AUTOMATICALLY RECORDED ACCORDING TO OBJECTIVE CRITERIA

(75) Inventor: Yasutaka Hira, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 466 days.

(21) Appl. No.: 11/012,354

(22) Filed: Dec. 16, 2004

(65) Prior Publication Data
US 2005/0147378 A1    Jul. 7, 2005

(30) Foreign Application Priority Data
Dec. 18, 2003    (JP)    ............... 2003-420372

(51) Int. Cl.
*H04N 5/76*    (2006.01)
(52) U.S. Cl. .......................................... 386/83; 725/53
(58) Field of Classification Search .................. 725/38, 725/39, 40, 44–49, 51–53; 386/52, 83
See application file for complete search history.

(56) References Cited
U.S. PATENT DOCUMENTS

| 5,808,608 | A | * | 9/1998 | Young et al. | ............... 725/52 |
| 6,163,316 | A | * | 12/2000 | Killian | ............... 715/721 |
| 7,277,859 | B2 | * | 10/2007 | Watanabe et al. | ............... 704/278 |
| 2003/0118323 | A1 | * | 6/2003 | Ismail et al. | ............... 386/83 |
| 2003/0170000 | A1 | * | 9/2003 | Iwashita et al. | ............... 386/46 |
| 2004/0013409 | A1 | * | 1/2004 | Beach et al. | ............... 386/83 |
| 2006/0010470 | A1 | * | 1/2006 | Kurosaki et al. | ............... 725/46 |
| 2006/0026647 | A1 | * | 2/2006 | Potrebic et al. | ............... 725/53 |

FOREIGN PATENT DOCUMENTS

| JP | 11-238071 | | 8/1999 |
| JP | 2001-103404 | A * | 4/2001 |
| JP | 2002-10153 | * | 1/2002 |

* cited by examiner

*Primary Examiner*—David E Harvey
(74) *Attorney, Agent, or Firm*—Mattingly & Malur, P.C.

(57) ABSTRACT

Automatic video recording system and method are provided which make it possible that programs to be automatically recorded are selected according to objective criteria from the programs that are scheduled to broadcast in the future. In configuration, an information generator of a program information providing server ranks the broadcast programs on the basis of program rating information, and thus generates program rank prediction information. Terminal units download the program rank prediction information and an electronic program schedule. A recorded-program/digest generator makes broadcast programs of a certain rank or above be automatically recorded by referring to the program rank prediction information.

10 Claims, 9 Drawing Sheets

| ○× TV | ×× /○○ |
|---|---|
| PROGRAM ○× a | RANK A |
| PROGRAM ○× b | RANK B |
| PROGRAM ○× c | RANK C |
| PROGRAM ○× d | RANK B |
| PROGRAM ○× e | RANK C |
| · · | |
| PROGRAM ○× z | RANK B |

| △△ TV | ×× /○○ |
|---|---|
| PROGRAM △△ a | RANK B |
| PROGRAM △△ b | RANK A |
| PROGRAM △△ c | RANK C |
| PROGRAM △△ d | RANK B |
| PROGRAM △△ e | RANK C |
| · · | |
| PROGRAM △△ z | RANK C |

| ○○ TV | ×× /○○ |
|---|---|
| PROGRAM ○○ a | RANK C |
| PROGRAM ○○ b | RANK A |
| PROGRAM ○○ c | RANK B |
| PROGRAM ○○ d | RANK A |
| PROGRAM ○○ e | RANK C |
| · · | |
| PROGRAM ○○ z | RANK A |

RECORDING METHOD AND SYSTEM FOR SELECTING PROGRAMS TO BE AUTOMATICALLY RECORDED ACCORDING TO OBJECTIVE CRITERIA

INCORPORATION BY REFERENCE

The present application claims priority from Japanese application JP2003-420372 filed on Dec. 18, 2003, the content of which is hereby incorporated by reference into this application.

BACKGROUND OF THE INVENTION

The present invention relates to an automatic video recording system for selecting a program and recording it.

Recently, as the personal computer with a television recording function, the hard disk and the DVD recorder become widely used, it has become possible to previously set the timer of the system in order that a desired broadcast program can be selected from an electronic broadcast program schedule and recorded on time, and also to record a long-time program with the timer set. In addition, if the user previously registers user's preference in the system, the programs that the user seems to like can be automatically recorded without particularly ordering to record.

A prior art of this kind of technology is described in JP-A-11-238071.

SUMMARY OF THE INVENTION

In this prior art, the user's preference is fed as a user's parameter to the system, and the system detects a program that meets this user's parameter, and makes it be automatically recorded. However, the programs to be actually broadcast do not always match the parameter given by the user. In addition, in order to check if the automatically recorded program is surely the program desired by the user, it is necessary for the user to tentatively view the recorded program for a certain time. Therefore, it takes a long time for the user to adjust the parameter for picture recording to meet the user's preference.

As a method of selecting a program that the user desires to view, there is another technique for automatically producing the digests of the programs. When the digests are tried to produce, however, appropriate scenes cannot be correctly extracted from the programs because the criteria to extract are not defined.

It is an object of the invention to provide a video recording system in which the programs to be automatically recorded can be selected according to the kind of objective criteria.

In this invention, the video recording units are connected through a network to a server computer. The server computer ranks programs that are scheduled to broadcast in the future on the basis of the viewing rating information of the past broadcast programs, and generates program rank prediction information. The terminal units download the generated program rank prediction information through the network. The terminal units can employ the automatic video recording technique capable of automatically recording programs of the highest rank based on the program rank prediction information.

Other objects, features and advantages of the invention will become apparent from the following description of the embodiments of the invention taken in conjunction with the accompanying drawings.

DESCRIPTION OF THE EMBODIMENTS

An embodiment of the invention will be described with reference to the accompanying drawings.

Figure 1:
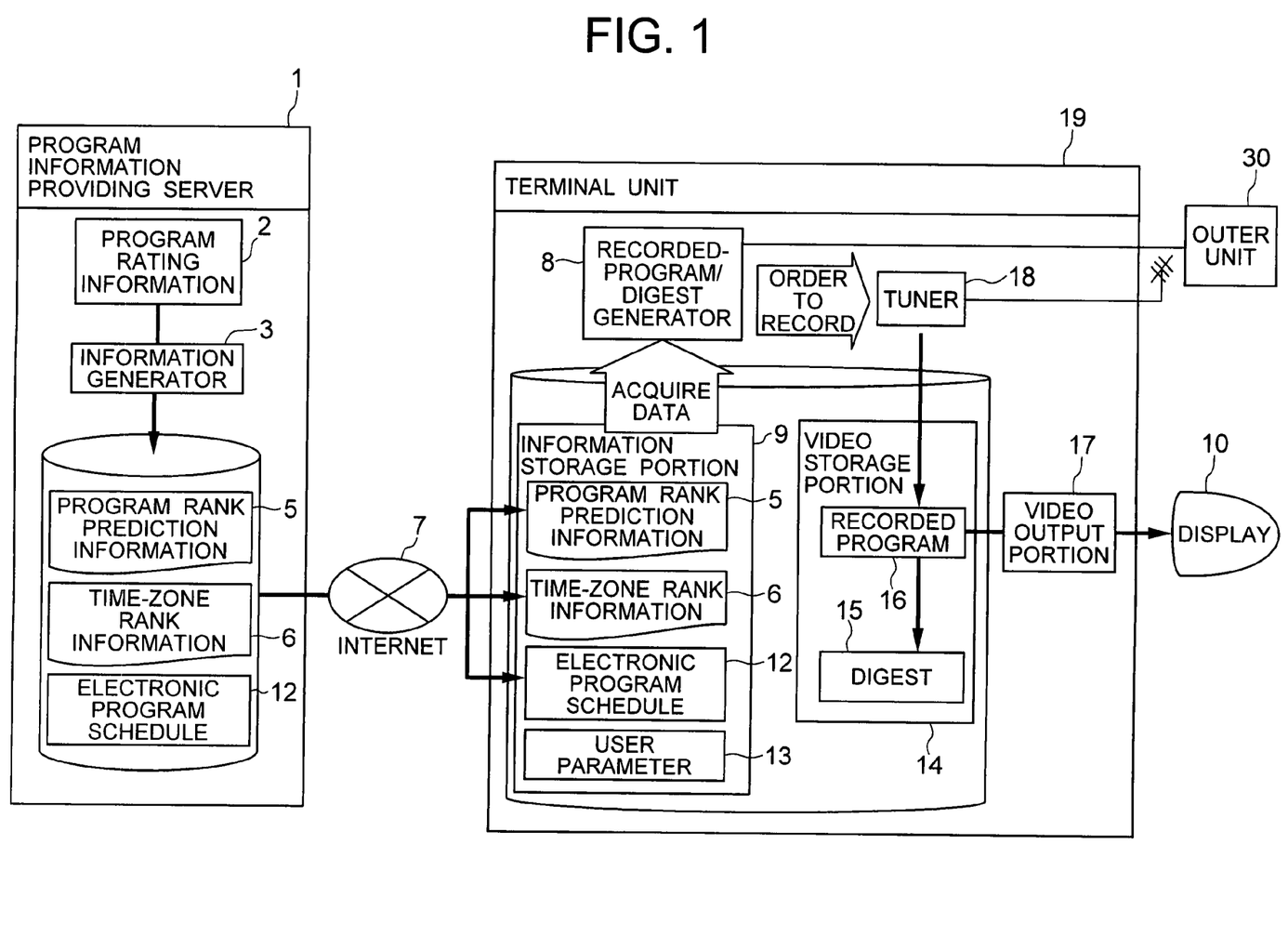
FIG. 1 is a block diagram of the construction of an automatic video recording system according to an embodiment of the invention.

FIG. 1 is a block diagram of an automatic video recording system according to an embodiment of the invention. This system has a program information providing server 1, a terminal unit 19, the Internet 7 connecting the program information providing server 1 and the terminal unit 19, and an outer unit 30 connected to the terminal unit 19.

The program-information providing server 1 is a server computer having a CPU, a memory and a storage unit such as a hard disk. The storage unit has stored therein program rating information 2, program rank prediction information 5, time-zone rank information 6 and electronic program schedule 12. The program rating information 2 is the viewing rating information of each broadcasting station, of each broadcast program and of each time zone, provided from a company that collects TV program ratings. The program rank prediction information 5 is the predictive information with ranks given for each of the programs to be scheduled to broadcast from each broadcast station. The time-zone rank information 6 is the information of time zones ranked according to the viewing rating of the time zones of each broadcast program of each broadcasting station. The electronic program schedule 12 is the tables of program names, genre, thorough category and chief actors arranged for each broadcast station, and for each program and each time zone broadcast in the past and to be broadcast in the future. The information generator 3 is the computer program that is stored in the memory and executed by the CPU. The information generator 3 ranks the programs to be scheduled to broadcast from each broadcast station by referring to the electronic program schedule 12 and program rating information 2 and on the basis of the average viewing rating of the past programs, and it causes the results to be written as the program rank prediction information 5. In addition, the information generator 3 determines the rating rank of each of the small time zones that constitute the time zone of each of the past programs of each broadcast station by referring to the program rating information 2, and it forces the results to be written as the time-zone rank information 6.

The terminal unit 19 is a personal computer or a video recorder, which has a CPU, a memory, a storage unit, a tuner 18 and a video output portion 17. A display 10 is connected to the terminal unit 19. The storage unit is formed of a hard disk or DVD. The storage unit has storage regions of an information storage portion 9 and a video storage portion 14. The information storage portion 9 contains the program rank prediction information 5, time-zone rank information 6, electronic program schedule 12 and user parameter 13. The program rank prediction information 5, time-zone rank information 6 and electronic program schedule 12 are downloaded from the program-information providing server 1. The user parameter 13 contains the parameters of the genre, thorough category and actors that the user likes, and of time zones during which the user often views TV. The video storage portion 14 contains video information of recorded program 16 and digest 15. The recorded program 16 is the recorded video images of the high-rank programs selected from the program rank prediction information 5 according to the user parameter 13. The digest 15 is the video images resulting from digesting the recorded program 16.

The recorded-program/digest generator 8 is the program stored in the memory and executed by the CPU. The recorded-program/digest generator 8 selects a high-rank program from the program rank prediction information 5 by referring to the electronic program schedule 12, and according to the user parameter 13, and issues a command to record the selected program to the tuner 18. The tuner 18 is the hardware that records the TV program according to the specified channel and broadcasting time zone, and causes the recorded program 16 to be stored in the video storage portion 14. In addition, the recorded-program/digest generator 8 uses the time-zone rank information 6 to generate the digest of the recorded program 16, and causes the video images of the digest 15 to be stored in the video storage portion 14. The video output portion 17 is the hardware that converts the video information of the recorded program 16 and the digest 15 to a signal capable of being displayed on the display 10, and supplies the signal to the display 10.

The outer unit 30 is the remote controller of a personal computer or video recorder, or a portable telephone. This unit 30 is connected to the terminal unit 19 through a transmission path or network. The outer unit 30 is used to input the user parameter 13 to the terminal unit 19 or supply control data to the recorded-program/digest generator 8 so that the timer setting can be manually made for the recording of a program.

Figure 2:
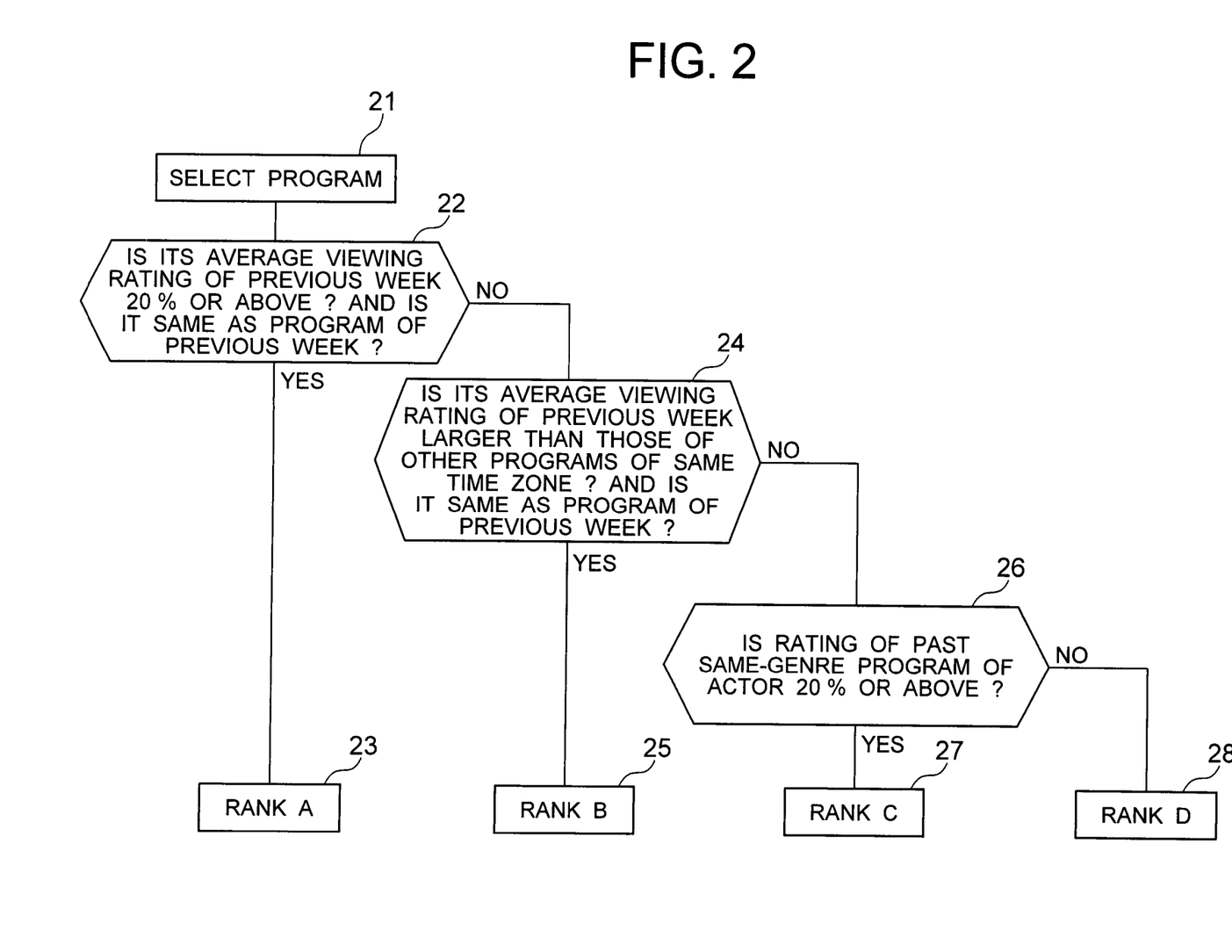
FIG. 2 is a flowchart showing the process flow in an information generator 3 for generating program rank prediction information 5 according to the embodiment.

FIG. 2 is a flowchart showing the process flow in the information generator 3 that generates the program rank prediction information 5. The information generator 3 selects one broadcast-pending program of this week of a particular station from the electronic program schedule 12 (step 21), and judges whether the average viewing rating of this program on the previous week is more than 20% and whether this program is the same as that on the previous week (step 22). Since the electronic program schedule 12 holds the program names of each station of the previous week and this week, the same program name of like station of the previous week, if present, will be judged to be the same program as that of this week. If the same program is found, the information generator 3 refers to the average viewing rating of this program of the previous week in the program rating information 2, and examines whether it is more than a predetermined rating (20% in this example). If the judgment is YES, this program is predicted to be rank A (step 23).

If the judgment is NO in step 22, the information generator 3 judges whether the average viewing rating of this program of the previous week is larger than those of the other programs of the same time zone and whether this program of the previous week is the same as that of this week (step 24). The step 22 already judged whether this program of this week is the same as that of the previous week of the same broadcast station. Thus, if there is the same program, the information generator 3 acquires the broadcast time zone of that program by referring to the electronic program schedule 12, and judges whether the average viewing rating of that program is larger than those of the other programs of the same time zone without specifying any broadcast station. If the judgment is YES, this program is predicted to be rank B (step 25).

If the judgment in step 24 is NO, the information generator 3 judges whether the past program of the actor appearing in that program is more than a certain rating (20% in this example) in the same genre (step 26). The information generator 3 acquires the genre and main actors of that program by referring to the information of this program in the electronic program schedule 12. Then, the information generator 3 searches the electronic program schedule 12 for the past programs by using key words of the same actor name and genre, and thereby extracts all other programs of the same genre and in which the same actor appears without specifying any station. In addition, the information generator 3 searches the program rating information 2 by using key words of the station name, program name and broadcasting date and time of each of the extracted programs, and it judges whether there is a program of which the average rating is more than a predetermined value (20% in this example). If the judgment is YES, this program is predicted to be rank C (step 27). If the judgment is NO, the information generator 3 predicts this program to be rank D (step 28).

Figure 4:
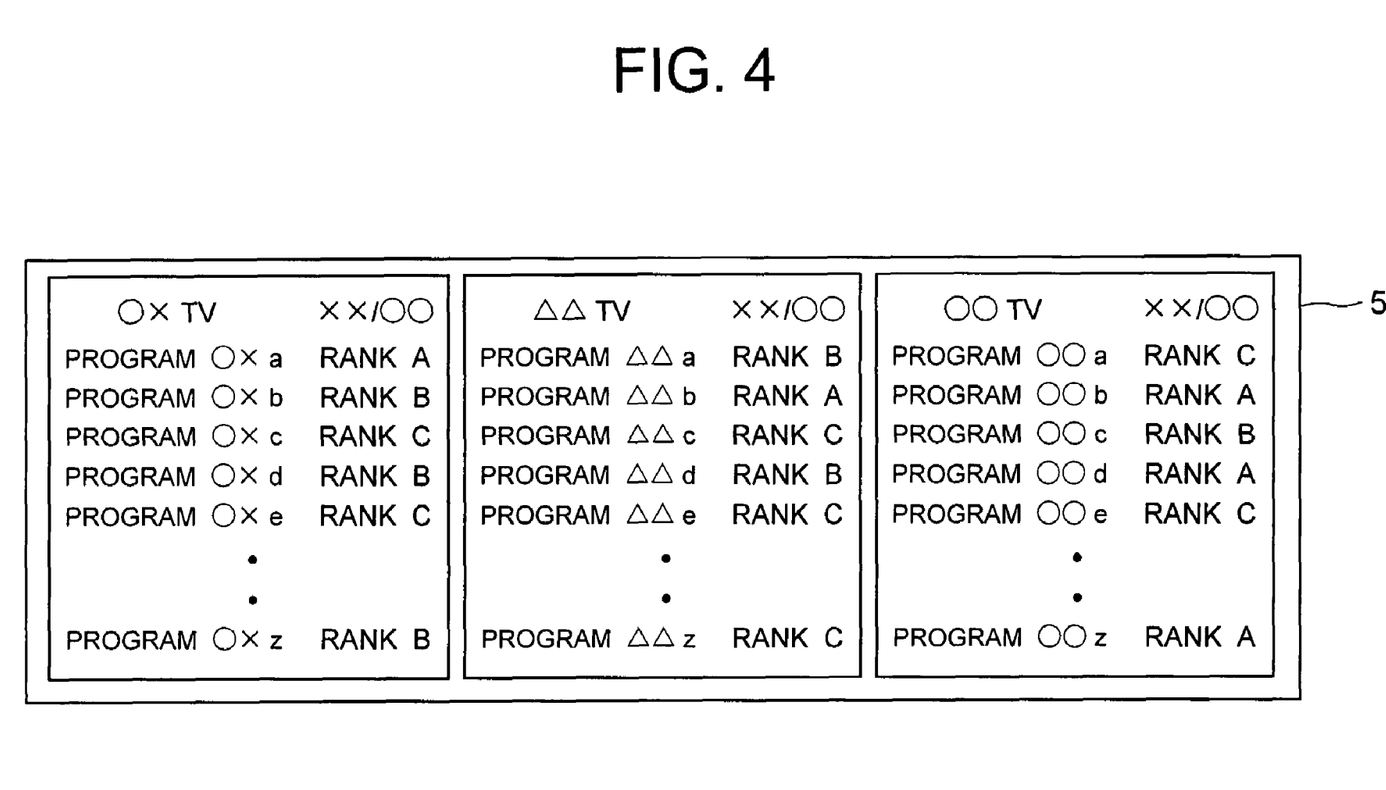
FIG. 4 is a table showing an example of the program rank prediction information 5.

The information generator 3 repeats the processes of steps 21 through 28 on all the not yet aired programs of this week of each station to produce the program rank prediction information 5. FIG. 4 shows an example of the program rank prediction information 5.

In the above case, only the average rating of the same program of the previous week may be simply used as the judgment conditions for the program ranking. If the average rating of a program is over 20%, 20%~15%, 15%~10%, and under 10%, the program is judged to be rank A, rank B, rank C and rank D, respectively. The classification of programs into four ranks is an example.

Figure 3:
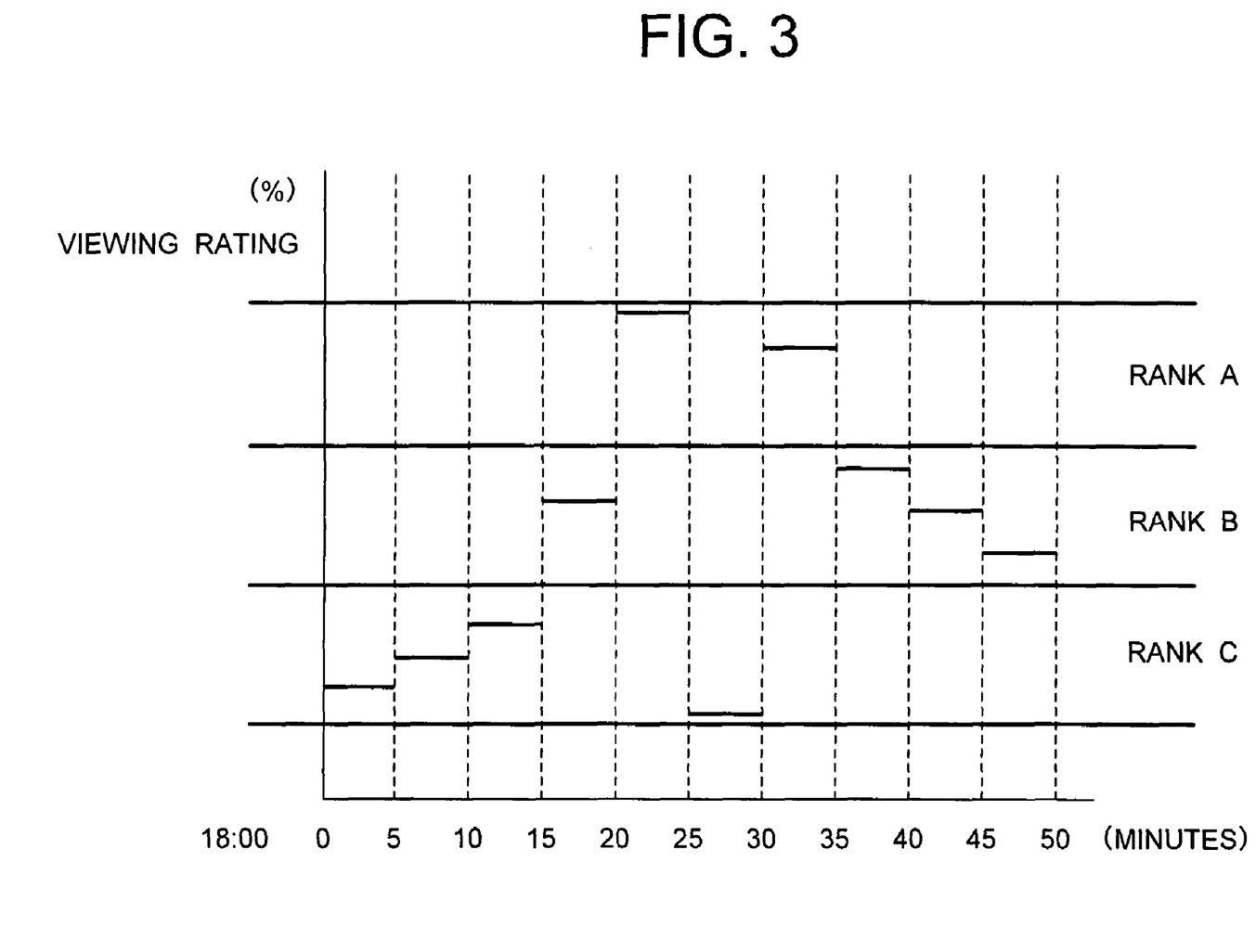
FIG. 3 is a diagram to which reference is made in explaining the way to rank the time zones of programs according to the embodiment.

FIG. 3 is a diagram to which reference is made in explaining the way to rank the time zones. The time zone in which a certain program is started to broadcast from a time is divided into a plurality of shorter small-time zones, and the viewing rating of each small time zone is plotted as in FIG. 3. In this example, a program starts at 18:00, and ends at 18:50, and the broadcasting time zone of this program is divided into small time zones of 5 minutes each so that the rating of each small time zone can be plotted. The maximum rating and minimum rating of the ratings of the small time zones of this program are simply taken as the maximum and the minimum, respectively. The program is decided to be rank A when having the rating in the range from the maximum to (the maximum−the minimum)×⅔+the minimum, rank B in the range from the minimum value of the rank A to (the maximum−the minimum)×⅓+the minimum, and rank C in the range of the minimum value of the rank B to the minimum of all ratings. In other words, the range of ratings from the maximum to the minimum is divided into three portions, or three ranks, which are assigned to each small time zone according to the above conditions. The three divisions are an example.

The information generator 3 acquires the viewing ratings of the small time zones of the previous-week program of a particular station from the program rating information 2, and computes the range of ratings of each rank from the maximum and the minimum. The information generator 3 then judges which rank the rating of each small time zone belongs to, and determines the ranks of the small time zones. The information generator 3 repeats the above processes on all broadcast programs of the previous week of each station to produce the time-zone rank information 6.

Figure 5:
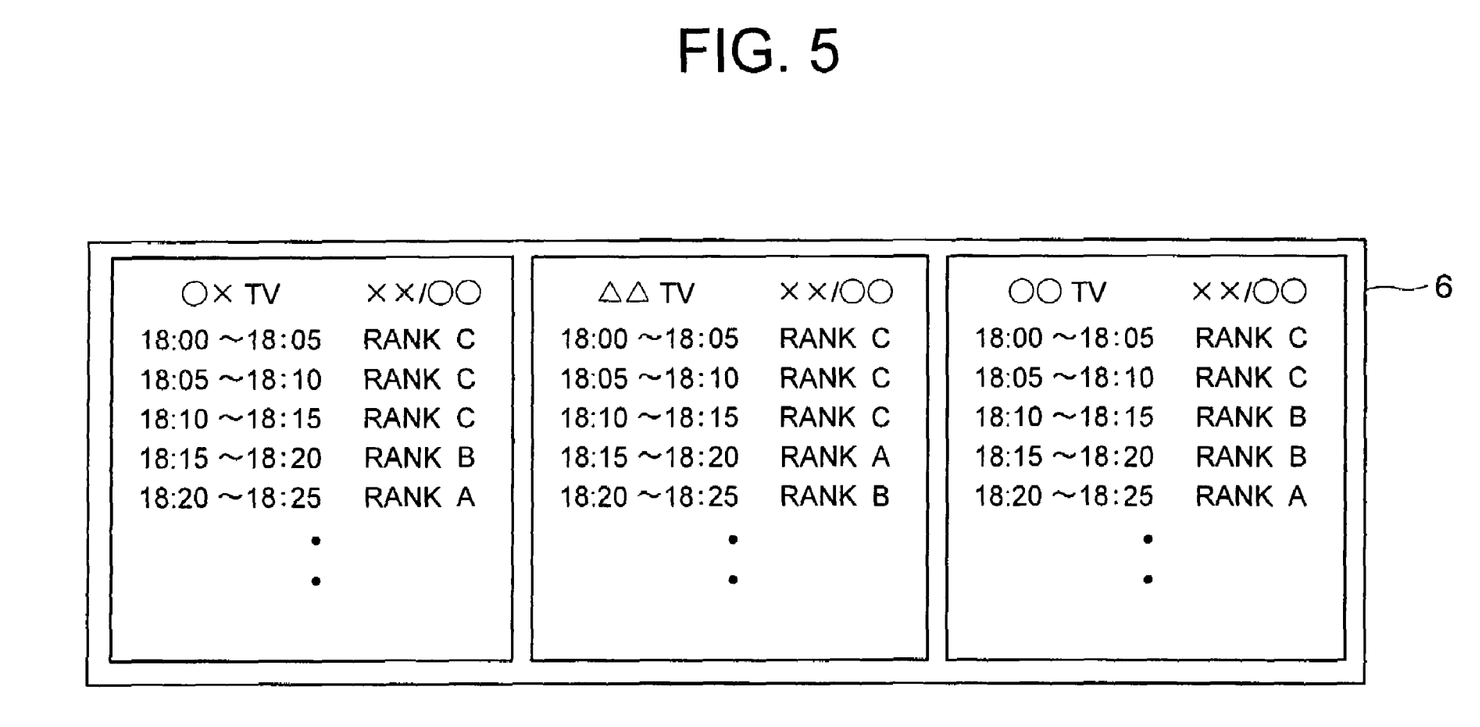
FIG. 5 is a table showing an example of time-zone rank information 6.

FIG. 5 shows an example of the time-zone rank information 6.

The program rank prediction information 5, time-zone rank information 6 and electronic program schedule 12 thus produced are downloaded to the information storage portion 9 of the terminal unit 19 when they are ordered by the terminal unit 19. In other words, the terminal unit 19 has a program to download the above information. Alternatively, the above information may be downloaded to the terminal unit 19 at regular intervals specified by the user.

Figure 6:
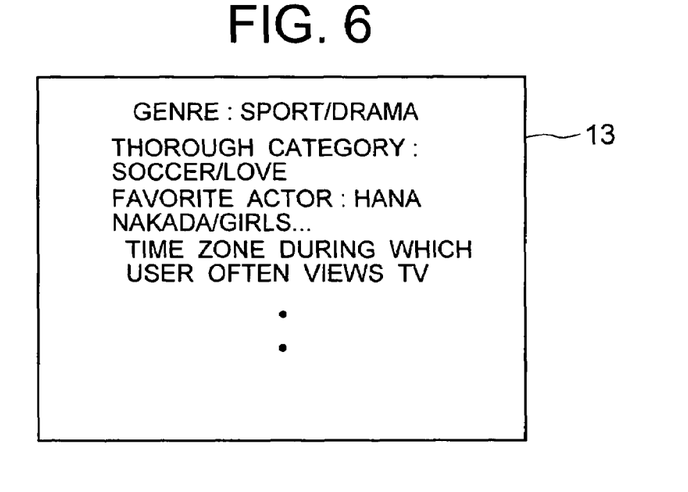
FIG. 6 is a diagram showing an example of user parameter 13.

FIG. 6 shows an example of the user parameter 13 entered from the terminal unit 19 or outer unit 30. In this example, the user parameter 13 is set to include genre, thorough category, favorite actors, and time zones during which the user often views TV.

Figure 7:
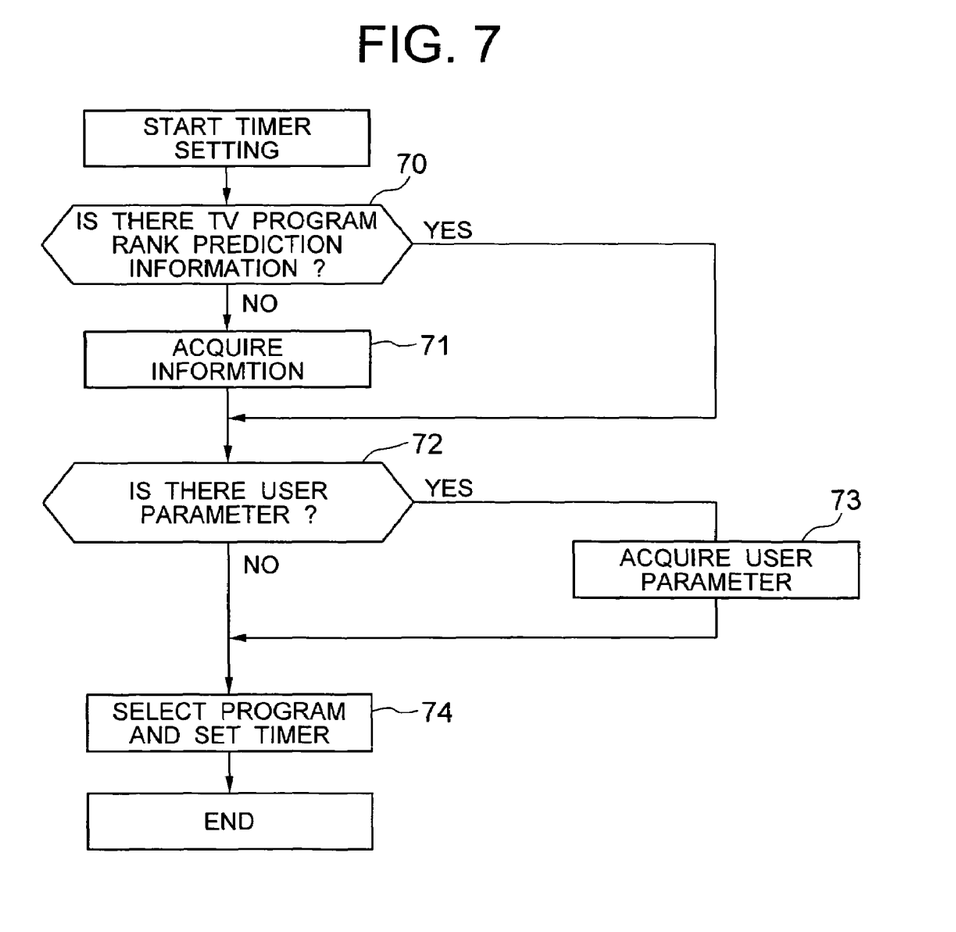
FIG. 7 is a flowchart showing the procedure in a recorded-program/digest generator 8 for selecting a program to be recorded and recording it with a timer set in order that the program can be started to record when the preset time comes in this embodiment.

FIG. 7 is a flowchart showing the procedure in the recorded-program/digest generator 8 that selects a program to be recorded, and sets the timer for the recording. The recorded-program/digest generator 8 first judges whether the information storage portion 9 contains the program rank prediction information 5 (step 70). If the judgment is YES, the process goes to step 72. If the judgment in the step 70 is NO, it acquires the program rank prediction information 5 from the program-information providing server 1 (step 71), and then the process goes to step 72. Subsequently, the recorded-program/digest generator 8 judges whether the user parameter 13 is contained within the information storage portion 9 (step 72). If the judgment is NO, the process goes to step 74. If the judgment in step 72 is YES, the user parameter is acquired from the information-storing portion 9 (step 73), and the process goes to step 74. Then, the recorded-program/digest generator 8 selects a program to be recorded, and sets the timer for the recording of this program (step 74).

Figure 8:
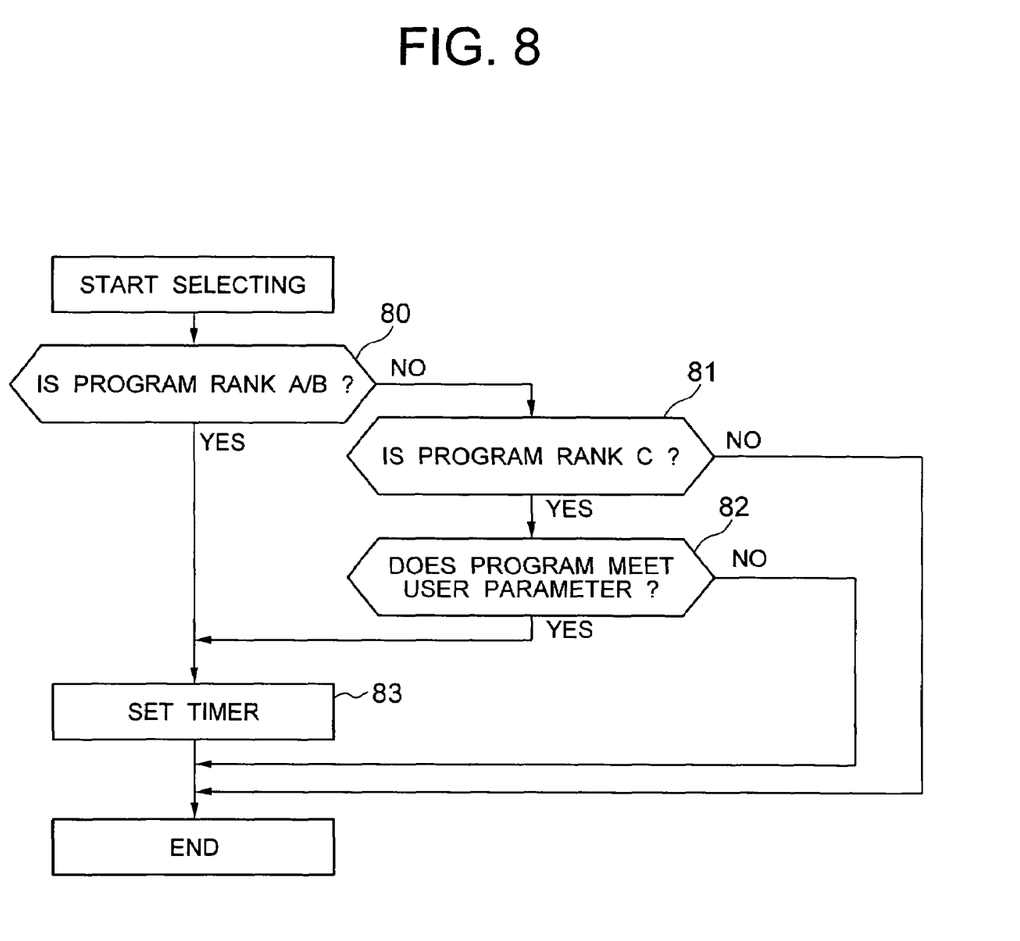
FIG. 8 is a flowchart showing the procedure for the selection of the program to be recorded and timer setting.

FIG. 8 is a flowchart showing the developed procedure of step 74 in the recorded-program/digest generator 8. The recorded-program/digest generator 8 acquires the rank information of each program of each station from the program rank prediction information 5, and judges whether that program is rank A or B (step 80). If the judgment is YES, the process goes to step 83. If the judgment in step 80 is NO, the generator 8 judges whether this program is rank C (step 81). If the judgment in step 81 is NO, the process on this program ends. If the judgment in step 81 is YES, and if there is the user parameter 13, the genre, thorough category, actors and broadcast time zone of this program are acquired from the electronic program schedule 12, and judgment is made of whether these genre, thorough category, actors and broadcast time zone coincide with those of the user parameter 13 (step 82). If the judgment in step 82 is NO, the process on this program ends. If the judgment in step 82 is YES, the process goes to step 83. Then, the recorded-program/digest generator 8 sets the timer for recording the selected program (step 83). In other words, it notifies the tuner 18 of the channel number and broadcast time zone, and issues a record command to the tuner 18. The recorded-program/digest generator 8 repeats the processes of steps 80 through 83 on all the not yet aired programs of this week of each station registered in the program rank prediction information 5.

As a result, when the broadcast time set in the timer comes, the program is automatically recorded, and the video images of recorded program 16 are stored in the video storage portion 14.

Although the step 80 takes rank-A or rank-B programs to be recorded by means of timer setting, it may take only the rank-A programs to be recorded by means of timer setting. In that case, the judgment step 81 is changed to "rank-B program?" or "rank-B or rank-C program?"

Figure 9:
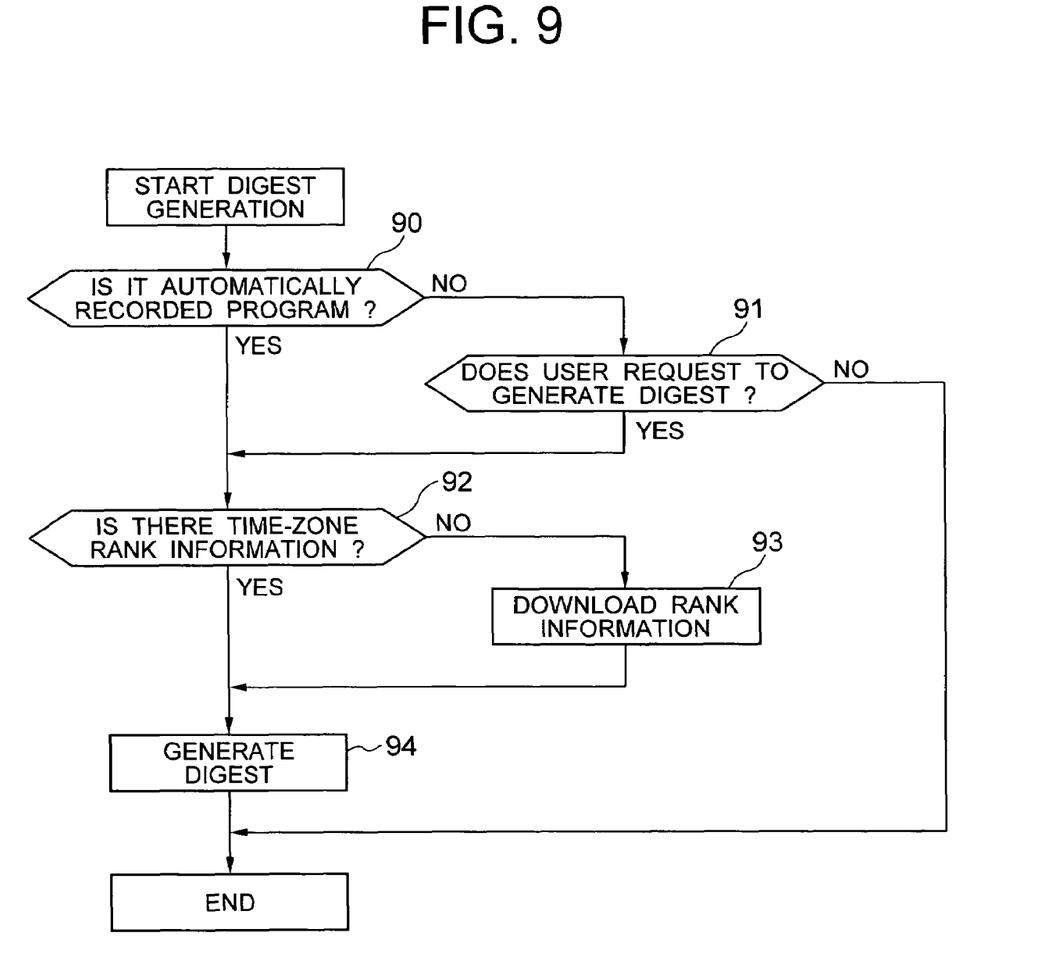
FIG. 9 is a flowchart showing the procedure in the recorded-program/digest generator 8 for generating the digests in this embodiment.

FIG. 9 is a flowchart showing the process flow in the recorded-program/digest generator 8 for generating the digest. The recorded-program/digest generator 8 makes the judgment of whether the recorded program 16 stored in the video storage portion 14 is the program automatically recorded (step 90). If the judgment is NO, this program is a program manually recorded by the user, and thus judgment is made of whether a request for the digest is issued from the user (step 91). If the judgment in step 91 is NO, the process on this recorded program ends. If the judgment in step 90 is YES, the process goes to step 92.

Then, the recorded-program/digest generator 8 judges whether the information-storing portion 9 contains the time-zone rank information 6 (step 92). If the judgment in step 92 is YES, the process goes to step 94. If the judgment in step 92 is NO, the time-zone rank information 6 is downloaded from the program information providing sever 1 (step 93), and then the process goes to step 94. Subsequently, the recorded-program/digest generator 8 judges whether the time-zone rank information contains the rank information of the same program of the previous week as this recorded program 16. If it contains, video images are extracted from the recorded program 16 according to that rank information to form the digest 15 (step 94).

Figure 10:
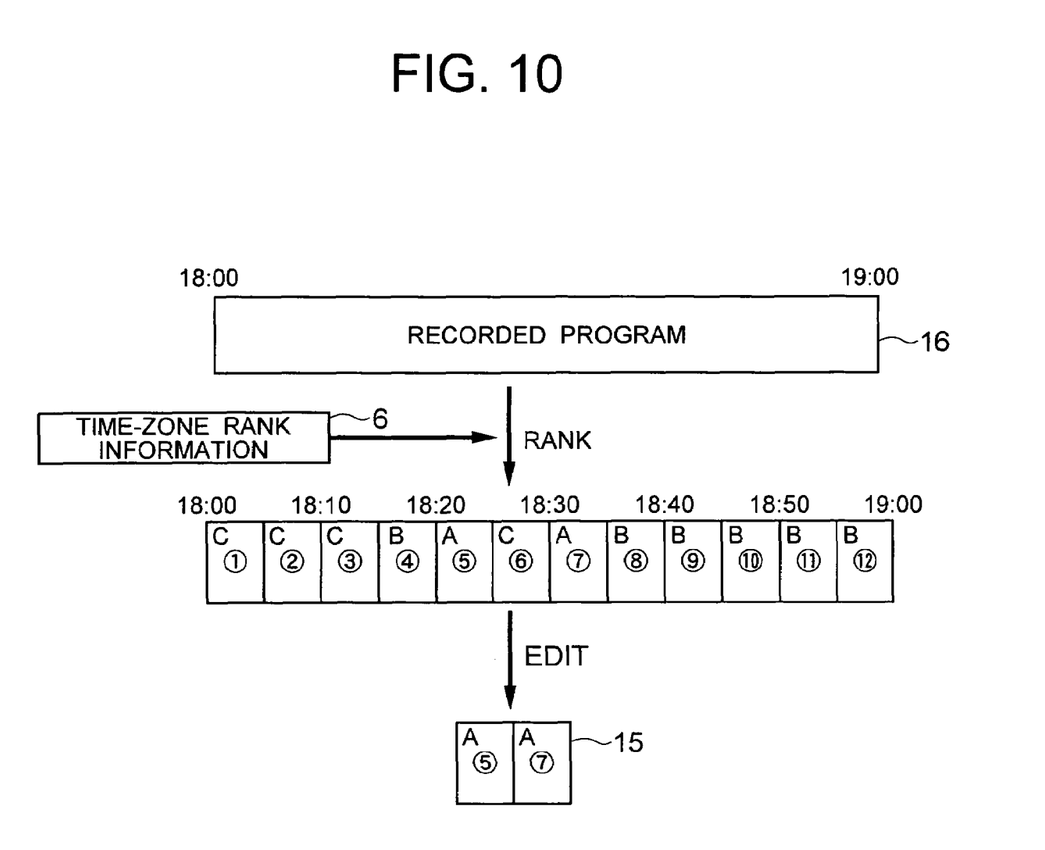
FIG. 10 is a diagram to which reference is made in explaining the procedure for the digest generation in this embodiment.

FIG. 10 is a diagram to which reference is made in explaining the procedure for generating the digest. The recorded program 16 is divided into video images of small time zones, and each small time zone of video images is ranked according to the time-zone rank information 6 of the same program broadcast in the past. Then, the small rank-A time zones of video images are cut away from the recorded program 16 and connected together by editing operation so that the digest 15 can be produced.

In the above embodiment, the terminal unit 19 receives the program rank prediction information or time-zone rank information from the program information providing server, and generates the timer-recording information and information for the recording and reproduction of the digest from the rank information and user recording parameter on the basis of the electronic program schedule. However, the timer-recording information and digest information may be generated from the program-information providing server without limiting to the generation from the terminal unit 19.

In this case, the server for providing the program information acquires the user recording parameter from each of a plurality of terminal units connected to the server, and after ranking the programs as in FIG. 2, it makes the timer recording process as shown in FIG. 8. The sever judges whether each of all the programs in the electronic program schedule is to be recorded by using the timer in each terminal unit, and transmits the generated timer-recording information to the corresponding terminal unit. The terminal unit that has received this timer-recording information automatically records on the basis of this timer-recording information.

Similarly, the server generates the digest information. In other words, it generates recording/reproduction information of each of the programs in the electronic program schedule on the basis of the time-zone rank information, and transmits it as the program-digest information to the corresponding terminal unit. The terminal unit generates the digest and reproduces the digests of the recorded programs on the basis of the received program-digest information.

According to the invention, the programs to be automatically recorded can be selected on the basis of the objective criteria as the viewing rating information of programs.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A video recording system comprising:
   program rank information providing means for providing program rank information based on viewing rating information of broadcast programs;
   means for storing broadcast schedule information of broadcast programs; and
   recording control means for controlling video programs to be recorded on the basis of said program rank information and said broadcast schedule information,
   wherein said program rank information is formed of information about rank of each program based on its viewing rating,
   wherein said recording control means makes timer setting for recording said broadcast programs of a predetermined rank or above based on said program rank information, and
   wherein said program rank information includes a first rank defining that said broadcast programs are a series of programs and that their previous viewing ratings are larger than a certain value, and a second rank defining that said broadcast programs are a series of programs and that their viewing ratings are larger than those of the other programs of the same time zone.

2. A video recording system according to claim 1, wherein said recording control means makes timer setting for recording said broadcast programs of said first rank or said second rank based on said program rank information.

3. A video recording system comprising:
   program rank information providing means for providing program rank information based on viewing rating information of broadcast programs;
   means for storing broadcast schedule information of broadcast programs;
   recording control means for controlling video programs to be recorded on the basis of said program rank information and said broadcast schedule information;
   means for storing said program rank information as information about rank of each program based on its viewing rating, and a user parameter for specifying video information that the user likes,
   wherein said recording control means makes timer setting for recording said broadcast programs of a certain rank or above based on said program rank information or of said broadcast programs of which the program information includes said user parameter,
   wherein said program rank information includes a first rank defining that said broadcast programs are a series of programs and that the previous viewing rating is larger than a predetermined value, a second rank defining that said broadcast programs are a series of programs and that their viewing ratings are larger than those of the other programs of the same time zone, and a third rank defining that the actors of said broadcast programs appear in the past programs of the same genre, and that their viewing ratings are larger than a predetermined value, and
   wherein said recording control means makes timer setting for recording said broadcast programs of said first rank or said second rank based on said program rank information or makes timer setting for recording said broadcast programs of said third rank based on said program rank information and of which the program information includes said user parameter.

4. A video recording system for recording and reproducing video information comprising:
   program rank information acquiring means for acquiring program rank information produced according to the viewing ratings of broadcast programs;
   means for storing a user parameter that specifies the video information that the user likes; and
   recording/reproducing control means for controlling the recording and reproduction of video programs on the basis of said program rank information acquired from said program rank information acquiring means and said stored user parameter,
   wherein said program rank information has information about such ranks of certain time units of each of said broadcast programs as given according to their viewing ratings, and
   wherein said recording control means makes editing to cut video information of time zones of a certain rank or above based on said program rank information away from recorded video information, and generates digest video information of said recorded video information.

5. A video recording system for recording and reproducing video information comprising:
   program rank information acquiring means for acquiring program rank information produced according to the viewing ratings of broadcast programs;
   means for storing a user parameter that specifies the video information that the user likes; and
   recording/reproducing control means for controlling the recording and reproduction of video programs on the basis of said program rank information acquired from said program rank information acquiring means and said stored user parameter,
   wherein said program rank information has information about such ranks of certain time units of each of said broadcast programs as given according to their viewing ratings, and
   wherein said recording control means cuts video information of time zones of a predetermined rank or above based on said program rank information away from recorded video information, and makes said cut-away video information be reproduced.

6. A method of controlling video information in a video recording system comprising the steps of:
   acquiring program rank information based on viewing rating information of broadcast programs from a program rank information providing server;
   acquiring broadcast schedule information of said broadcast programs from said server;

generating video control information for controlling recording/reproduction of video programs on the basis of said program rank information and said broadcast schedule information; and recording/reproducing video information under the control of said video control information, wherein a process of generating said program rank information includes the steps of:

classifying the viewing rating information of said broadcast programs according to predetermined widths of viewing rating;

ranking said broadcast programs according to the classified viewing rating information of said broadcast programs; and transmitting said rank information of each of said broadcast programs as said program rank information to video recording units.

7. A method according to claim 6, further comprising the step of:

acquiring a user parameter such as genre of programs, actors, and viewing time zones, so that said video control information to control the recording/reproduction of video programs can be generated on the basis of said program rank information, said broadcast schedule information and said user parameter and that said video information can be recorded and reproduced under said generated video control information.

8. A method according to claim 7, further comprising the step of:

judging whether each of said broadcast programs in said broadcast schedule information is a part of a series of programs and ranks high according to said program rank information or each of said broadcast programs coincides with said user parameter, in which case, when the judgment is affirmative, timer-setting information of the corresponding program is generated from said broadcast schedule information.

9. A method of controlling video information in a video recording system comprising the steps of:

acquiring program rank information based on viewing rating information of broadcast programs from a program rank information providing server;

acquiring broadcast schedule information of said broadcast programs from said server;

generating video control information for controlling recording/reproduction of video programs on the basis of said program rank information and said broadcast schedule information; and recording/reproducing video information under the control of said video control information, wherein a process of generating said program rank information includes the steps of: classifying the viewing rating information of certain time widths of each of said broadcast programs; ranking said time widths of each of said broadcast programs according to said classified viewing rating information; and transmitting said rank information of said time widths of each of said broadcast programs as the program rank information to a video recording unit.

10. A method according to claim 9, wherein said video recording unit reproduces video information of said time widths, of each of said broadcast programs, having a certain rank or above based on said program rank information.

* * * * *